(12) United States Patent
Ozard

(10) Patent No.: US 9,099,862 B1
(45) Date of Patent: Aug. 4, 2015

(54) SELF ESD PROTECTED DEVICE AND METHOD THEREOF

(75) Inventor: Kenneth Sean Ozard, Middlesex, NJ (US)

(73) Assignee: Anadigics, Inc., Warren, NJ (US)

( * ) Notice: Subject to any disclaimer, the term of this patent is extended or adjusted under 35 U.S.C. 154(b) by 461 days.

(21) Appl. No.: 13/459,621

(22) Filed: Apr. 30, 2012

Related U.S. Application Data

(60) Provisional application No. 61/483,240, filed on May 6, 2011.

(51) Int. Cl.
*H02H 9/04* (2006.01)
*H02H 3/22* (2006.01)

(52) U.S. Cl.
CPC ............... *H02H 9/046* (2013.01); *H02H 3/22* (2013.01); *H02H 9/041* (2013.01)

(58) Field of Classification Search
CPC .......... H02H 3/22; H02H 9/041; H02H 9/046
See application file for complete search history.

(56) References Cited

U.S. PATENT DOCUMENTS

| | | | |
|---|---|---|---|
| 6,492,859 B2* | 12/2002 | Vashchenko et al. | 327/310 |
| 6,600,356 B1* | 7/2003 | Weiss | 327/310 |
| 7,280,332 B2* | 10/2007 | Ma et al. | 361/91.1 |
| 7,586,720 B1 | 9/2009 | Ozard | |
| 7,715,159 B2* | 5/2010 | Bazzano et al. | 361/56 |
| 2004/0057172 A1 | 3/2004 | Sun | |
| 2006/0158802 A1* | 7/2006 | Kawashimo et al. | 361/56 |
| 2008/0239597 A1* | 10/2008 | Van Bezooijen et al. | 361/56 |

* cited by examiner

*Primary Examiner* — Zeev V Kitov
(74) *Attorney, Agent, or Firm* — Ward & Zinna, LLC

(57) ABSTRACT

A self ESD protected RF transistor. The RF transistor is connected to a sub-circuit which causes the RF transistor to self-protect from ESD damage. The sub-circuit triggers the RF transistor to clamp a positive polarity ESD pulse to ground/emitter terminal. The sub-circuit also shunts a negative polarity ESD pulse to ground.

20 Claims, 3 Drawing Sheets

SELF ESD PROTECTED DEVICE AND METHOD THEREOF

CROSS REFERENCE TO RELATED APPLICATIONS

This application claims priority from US provisional application Ser. No. 61/483,240 filed on May 6, 2011, the disclosure of which is hereby incorporated by reference.

TECHNICAL FIELD

The present invention relates to radio frequency communication circuits and components thereof. More specifically, the present invention relates to a self electrostatic discharge (ESD) protected radio frequency (RF) transistor.

BACKGROUND

Electro Static Discharge (ESD) is a momentary flow of static charges that occurs between two surfaces with different potentials when the two surfaces come in contact. ESD is a major consideration in design and manufacture of semiconductor Integrated Circuits (ICs) because of the impact ESD has on production yields and product quality. ESD can occur in any one of the following conditions: when a charged human body touches an IC, when a charged IC touches a grounded surface, when a charged machine touches an IC, or when an electrostatic field induces a voltage across a dielectric sufficient to break it down. ESD can have serious detrimental effects on all semiconductor ICs and the electronic devices that contains them.

ESD problems are increasing in the electronics industry because of the trends toward higher speed and smaller device sizes. As the size of electronic devices become smaller by the day, unintentional contact between two components of different potential within the electronic device presents a challenge for designing and manufacturing the electronic devices. Further, ESD is a significant cause of rejection during the manufacturing of electronic devices and is important to the functioning of any electronic device throughout its lifetime. The input and output pins on an electronic device are especially vulnerable to ESD since users attach or detach external devices, such as antennas, on these pins.

Metal oxide semiconductors (MOS) are known to be especially susceptible to ESD, primarily because ESD can destroy and irreparably damage the thin oxide layer of the MOS device. Bipolar junction transistors (BJT) are usually considered to be less susceptible to ESD than MOS, but small heterojunction bipolar transistors (HBT), such as InGaP HBTs, are particularly susceptible to damage from ESD. Other structures that are susceptible to ESD include integrated capacitors and adjacent metal lines on a semiconductor die.

ESD can damage or reduce the life of an electrical device by exceeding the breakdown levels of dielectrics used in integrated circuits. Dielectrics susceptible to ESD often include capacitors and passivation dielectrics. ESD may also damage the semiconductor layers in an active device.

A common approach to reduce the damage caused by an unwanted ESD pulse is to provide a shunt path that directs the ESD pulse current away from the electrical device. Another approach to reduce the damage caused by the ESD pulse is by providing a robust path around, or parallel to, a sensitive device by adding a protection circuit.

In Radio Frequency (RF) communication circuits/components, the ESD pulse is reduced by employing a specially designed ESD protection circuit connected to the RF output port of an RF power amplifier. Conventionally, a separate circuit comprising a clamp transistor is implemented in RF amplifiers to protect them from ESD damages. Much progress has been made in the last few years with regard to technologies that reduce the effect of an ESD pulse on RF applications; this has led to the introduction of various new ESD circuits.

US patent publication 2004/0057172 A1 discloses ESD protection circuits that provide current shunt paths to protect electrical devices. FIG. 1 is a schematic diagram illustrating an ESD protection circuit 100 disclosed in the US patent publication 2004/0057172. The circuit shown in FIG. 1 includes a first port 102, a second port 104, and two branches 106 and 108. The two branches 106 and 108 are connected in parallel to each other between the first port 102 and the second port 104.

As shown in FIG. 1, the branch 106, the forward branch, provides a path for excess current from the first port 102 to the second port 104. The branch 108, the reverse branch, provides a path for excess current from the second port 104 to the first port 102.

The branch 106 shown in FIG. 1, comprises a base diode stack 110, a resistor 112, a triggering transistor 114, and a collector diode stack 116. The base diode stack 110 is connected in series with the resistor 112 in a voltage divider configuration. A base terminal of the triggering transistor 114 is connected to the voltage divider. An emitter terminal of the triggering transistor 114 is connected to the second port 104. The collector diode stack 116 is connected between the first port 102 and a collector terminal of the triggering transistor 114 and dissipates the bulk of the excess power through the branch 106 of the circuit.

Further, the base diode stack 110 is selected to set the triggering threshold of the branch 106. The resistor 112 is selected to keep the triggering transistor 114 switched off during normal operation and adjust the switch-off time of the triggering transistor 114 during an ESD pulse. The collector diode stack 116 may include one or more diodes connected in series or one or more transistors configured as diodes, connected in series.

The branch 108 shown in FIG. 1 comprises a reverse triggering transistor 118, a reverse collector diode stack 120, and a reverse base diode stack 122. In general, the reverse triggering transistor 118 remains switched off until the voltage at the second port 104 exceeds the sum of the diode junction drops in the reverse base diode stack 122 and the base-emitter turn-on voltage (the base-emitter diode junction drop) of the reverse triggering transistor 118.

In the circuit shown in FIG. 1, the triggering transistor 114 is generally switched off in order to prevent current flow from the high voltage node (i.e. the first port 102) to the low voltage node (i.e. the second port 104). When the voltage rises above the sum of the diode junction drops in the base diode stack 110 and the base-emitter turn-on voltage (the base-emitter diode junction drop) of the reverse triggering transistor 118, the current from the high voltage node 102 flows through the base diode stack 110 and through the resistor 112. As the current increases further, the voltage across the resistor 112 turns on the triggering transistor 114 on and allows the current to flow through the collector diode stack 116.

Further, when the reverse base diode stack 122 begins conducting current, the reverse triggering transistor 118 switches on after the transistor's base-emitter voltage drop is exceeded and a current begins to flow through the reverse collector diode stack 120 from the second port 104 to the first port 102.

In view of the above described illustration of FIG. 1, US patent publication 2004/0057172 provides a solution to protect electronic devices from ESD pulse. Protection is achieved by connecting an ESD protection circuit with the ports of the electronic device where protection from ESD pulse is required. Though the circuit provides protection from ESD pulse, it is too complex and bulky to be implemented in many RF applications. Therefore, in order to overcome the disadvantages and shortcomings of this circuit, an advanced ESD protection circuit is disclosed in U.S. Pat. No. 7,586,720.

U.S. Pat. No. 7,586,720, a patent by the inventor of the present invention, discloses an improved compact ESD protection circuit that uses a reverse breakdown voltage of a base-emitter junction as a trigger diode to switch a transistor that shunts the forward bias ESD pulse current to ground. The circuit disclosed in this patent will be described in detail later in the specification.

Although the circuit disclosed in US patent publication 2004/0057172 is effective in preventing damage from ESD pulse events, the diode capacitances detrimentally effect the operation at RF frequencies. Furthermore, the large part-count of the circuit increases the die area required to incorporate the circuit into an RF design. The compact ESD protection circuit disclosed in U.S. Pat. No. 7,586,720 replaces the large and complex components of the circuit disclosed in US patent publication 2004/0057172 with three small transistors resulting in the requirement of a very small die area as compared to the circuit disclosed in US patent publication 2004/0057172. The ESD circuit disclosed in U.S. Pat. No. 7,586,720 exhibits advantages over the circuit disclosed in US patent publication 2004/0057172, as it can be used to protect RFin pins in power amplifiers as well as DC pins. Further, the die area of the circuit in U.S. Pat. No. 7,586,720 is smaller than the die area of the circuit in US patent publication 2004/0057172. However, the die area of the circuit in U.S. Pat. No. 7,586,720 is still too large and costly for compact and/or very low cost devices. Therefore there is a need for an effective low cost ESD protection device that utilizes a smaller die area and is capable of operating at high frequencies.

SUMMARY

An object of the present invention is to provide circuitry and a method that enables the RF transistor in an RF amplifier circuit to self-protect from ESD pulse damage.

Another object of the present invention is to re-use the RF transistor as a clamp transistor that allows it to self-protect from ESD pulse damage.

Yet another object of the present invention is to provide a low cost ESD protection device that utilizes a smaller die area and is capable of operating at high frequencies.

In accordance with the objects of the present invention, various embodiments of the present invention provide a sub-circuit for protecting an electronic circuit comprising one or more RF transistors from an ESD. The sub-circuit includes a trigger circuit and a leakage circuit. The trigger circuit is connected between a collector terminal and a base terminal of each of the one or more RF transistors and is configured to trigger the one or more RF transistors to a pre-defined state on a positive polarity ESD pulse. The one or more RF transistors operating in the pre-defined state clamp the positive polarity ESD pulse. The leakage circuit is connected between the base terminal and an emitter terminal of each of the one or more transistors. Furthermore, the leakage circuit and the trigger circuit shunt a negative polarity ESD pulse to ground.

BRIEF DESCRIPTION OF THE DRAWINGS

Various embodiments of the present invention will hereinafter be described in conjunction with the appended drawings provided to illustrate and not to limit the present invention, wherein like designations denote like elements, and in which.

DESCRIPTION OF THE PREFERRED EMBODIMENTS

The present invention is directed to a self ESD protected RF transistor. The RF transistor is connected to a sub-circuit that allows the RF transistor to protect itself from ESD damage. The sub-circuit triggers the RF transistor to clamp a positive polarity ESD pulse to a ground/emitter terminal. The sub-circuit also shunts a negative polarity ESD pulse to the ground/emitter terminal. Therefore, the RF transistor replaces the clamp transistor of a conventional ESD protection circuit, eliminating the need for a separate ESD protection circuit to the RF amplifier circuit, thereby reducing the die area consumption as well as the cost of implementation.

Figure 2:
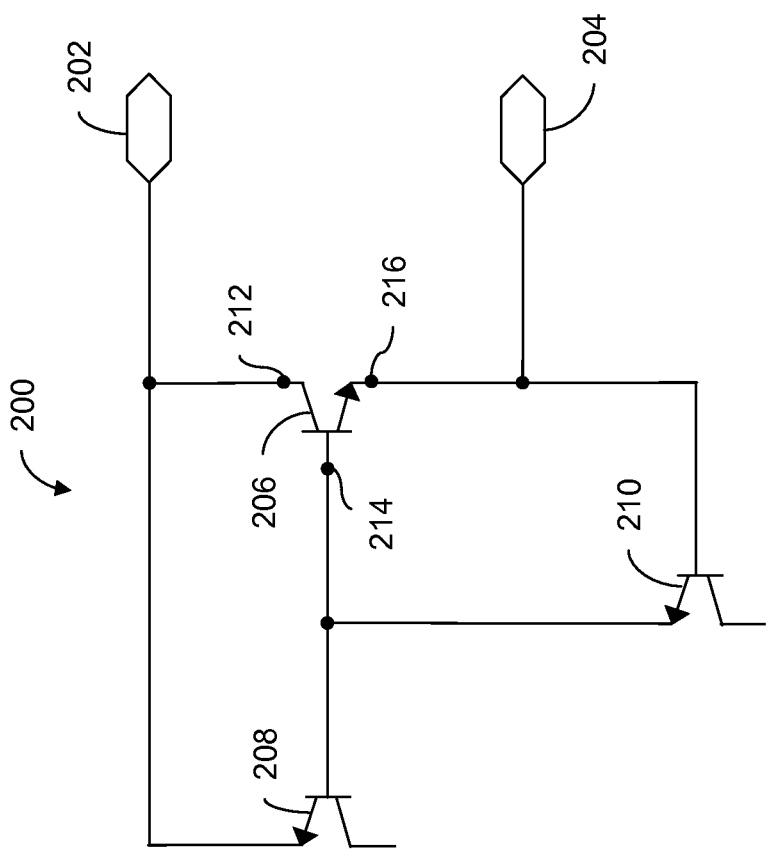
FIG. 2 is a schematic diagram illustrating a compact asymmetric ESD protection circuit in accordance with U.S. Pat. No. 7,586,720.

FIG. 2 is a schematic diagram illustrating a compact asymmetric ESD protection circuit 200 in accordance with U.S. Pat. No. 7,586,720. The circuit shown in FIG. 2 includes a first port 202, a second port 204, a clamping transistor 206, a triggering transistor 208 and a leakage transistor 210. The disclosed asymmetric ESD circuit diverts the ESD pulse currents in both directions, from the first port 202 to the second port 204 and from the second port 204 to the first port 202.

The triggering transistor 208 and the leakage transistor 210 are configured to function as diodes. In an embodiment, the triggering transistor 208 and the leakage transistor 210 are base-emitter diodes. In an embodiment, the base-emitter diodes are implemented using base and emitter terminals of an NPN HBT transistor. A person of ordinary skill in the art will appreciate that although the triggering transistor 208 and the leakage transistor 210 are shown as transistors, they can be implemented using diodes.

As shown in FIG. 2 the first port 202 and the second port 204 are connected separately to an input and/or output port of other electrical/electronics components/circuits where ESD protection is desired. For example, the first port 202 can be connected to a radio frequency (RF) input terminal and the second port 204 can be connected to a ground. In another example, the first port 202 can be connected to a reference voltage source and the second port 204 can be connected to the ground.

The clamping transistor 206, as shown in FIG. 2 comprises a collector terminal 212, a base terminal 214 and an emitter terminal 216. The collector terminal 212 of the clamping transistor 206 is connected to the first port 202 and to an emitter terminal of the triggering transistor 208. The base terminal 214 of the clamping transistor 206 is connected to a base terminal of the triggering transistor 208 and to an emitter terminal of the leakage transistor 210. The emitter terminal 216 of the clamping transistor 206 is connected to the second port 204 and to a base terminal of the leakage transistor 210.

In the circuit as shown in FIG. 2, when voltage at the first port 202 is greater than voltage at the second port 204, reverse biased base-emitter junction of the triggering transistor 208 prevents current flow from the first port 202 into the base terminal 214 of the clamping transistor 206 until the voltage at the first port 202 and at the second port 204 exceeds the sum of the breakdown voltage of the base-emitter junction and the turn-on base-emitter voltage drop of the clamping transistor 206. In general, the breakdown voltage of the triggering transistor is between 5 and 10 volts. More specifically, the breakdown voltage of the triggering transistor can be between 7 and 8 volts for certain transistor processes.

Further, when the breakdown voltage of the base-emitter junction of the triggering transistor 208 is exceeded, sufficient current flows into the base terminal 214 of the clamping transistor 206, such that the clamping transistor 206 turns on, thereby allowing the current to flow from the first port 202 through the collector terminal 212 and the emitter terminal 216 of the clamping transistor 206 to the second port 204.

As shown in FIG. 2, the leakage transistor 210 provides a shunt path when the voltage at the second port 204 is greater than the voltage at the first port 202 by at least two times the base-emitter diode forward voltage drop. When the voltage at the second port 204 is greater than the voltage at the first port 202 by at least two times the base-emitter diode forward voltage drop, the base-emitter junctions of the leakage transistor 210 and the triggering transistor 208 are forward biased and shunt the current from the second port 204 through the base-emitter junctions of the leakage transistor 210 and the triggering transistor 208 to the first port 202.

In an embodiment, in the circuit as shown in FIG. 2, the leakage transistor 210 provides a leakage path, such that the leakage current from the base-emitter junction of the triggering transistor 208 does not turn on the clamping transistor 206. If leakage current from the leakage transistor 210 flows into the base terminal 214 of the clamping transistor 206, the clamping transistor 206 may turn-on before the desired turn-on or protection threshold in the forward biased direction. If the clamping transistor 206 begins to turn-on prior to the desired turn-on voltage, the protection circuit leaks current in the forward biased direction which can cause highly undesirable effects, such as battery discharge.

Figure 1:
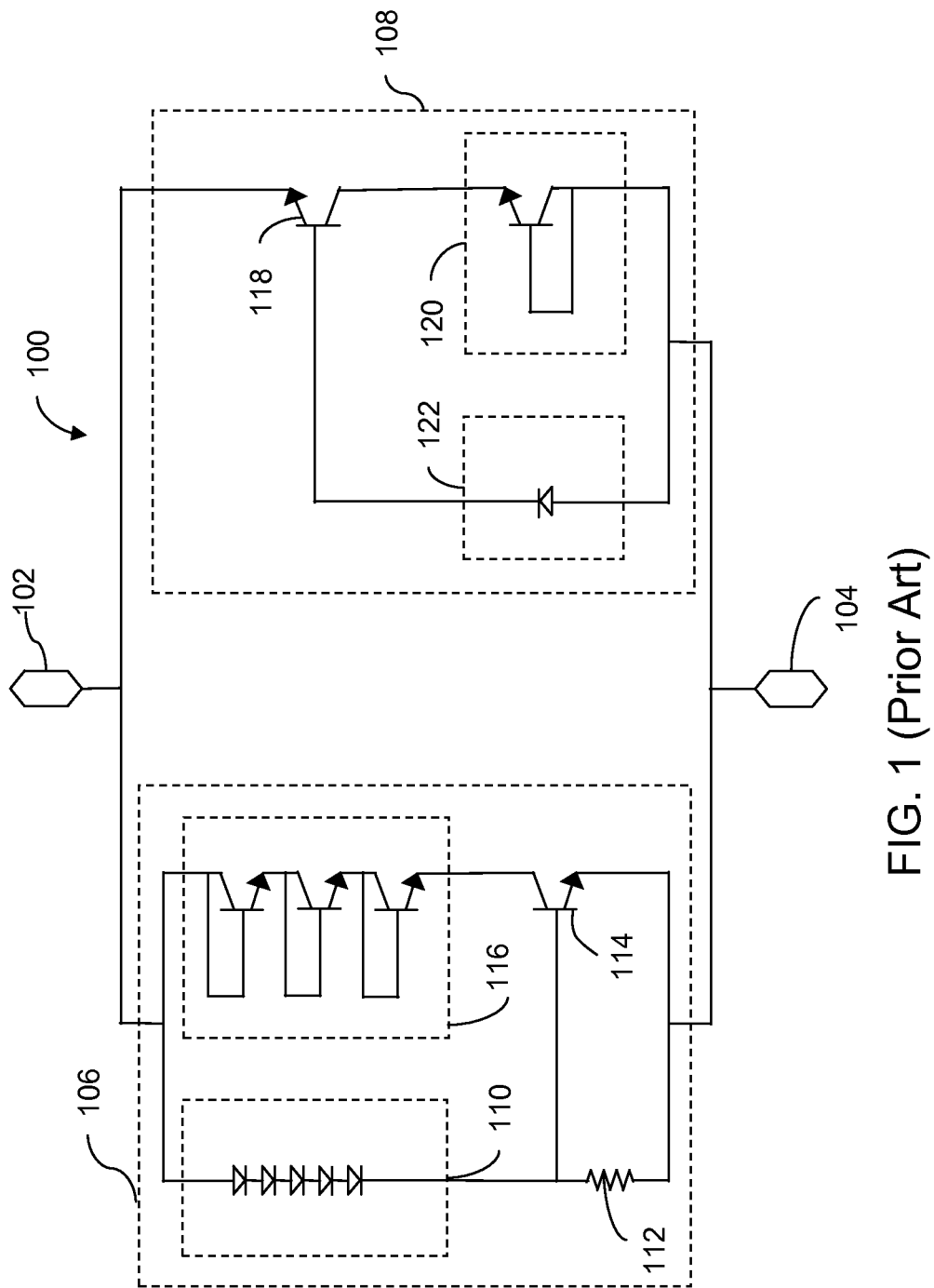
FIG. 1 is a schematic diagram illustrating an ESD protection circuit disclosed in US patent publication 2004/0057172.

In view of the above, the ESD protection circuit shown in FIG. 2 provides noticeable advantages over the circuit shown in FIG. 1. The circuit of FIG. 2 replaces the physically large and complex forward path circuit and the negative path circuit with three small components and also shows an improvement in ESD protection. However, the circuit of FIG. 2 still requires a substantial amount of die area for its implementation.

Figure 3:
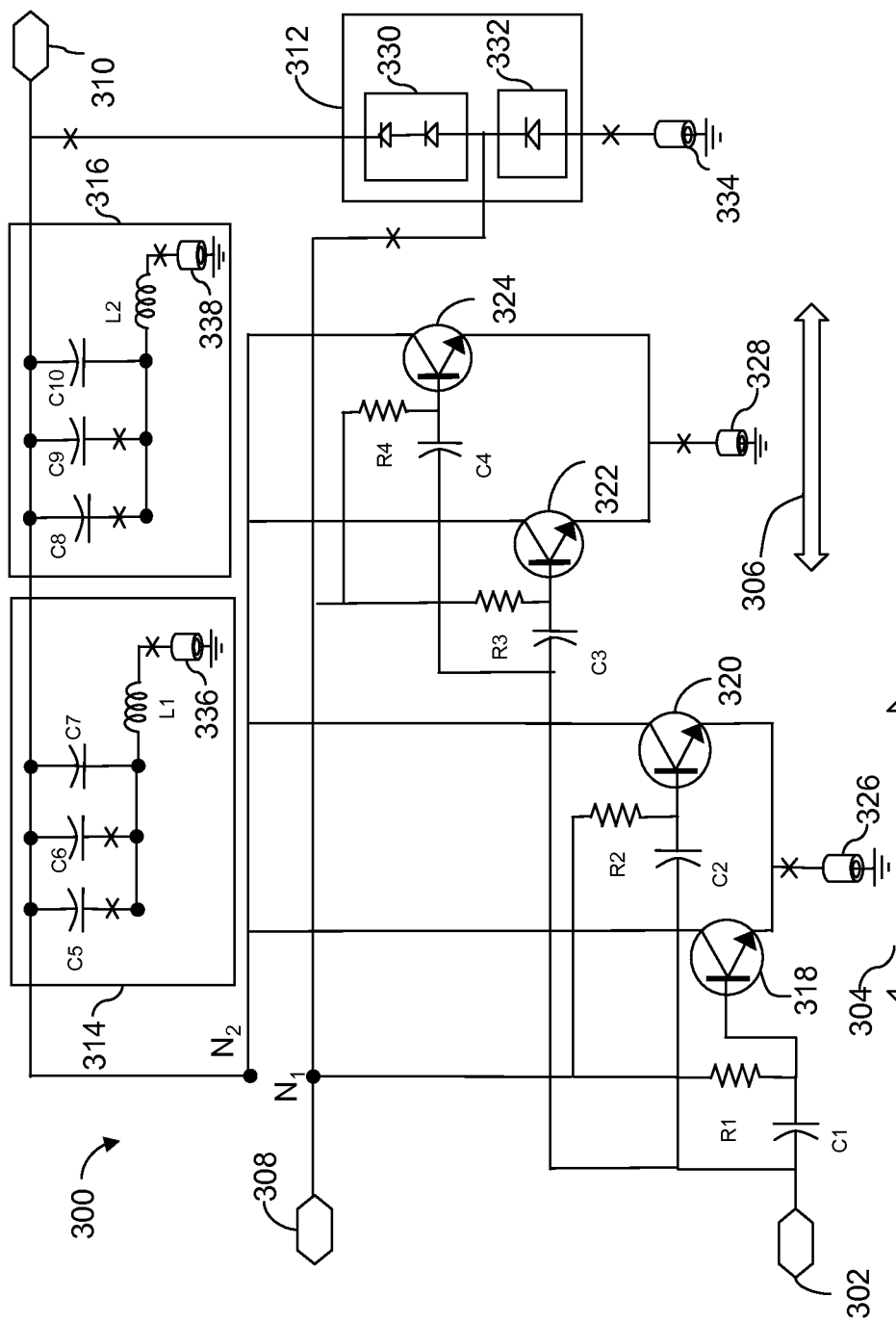
FIG. 3 is a schematic diagram illustrating a power amplifier circuit having a self ESD protected RF transistor in accordance with an embodiment of the present invention.

FIG. 3 is a schematic diagram illustrating an RF power amplifier circuit 300 having a self ESD protected RF transistor in accordance with an embodiment. The RF power amplifier circuit 300, as shown in FIG. 3, includes an RF input port 302 (base terminal of RF transistor), a first RF transistor bank 304, a second RF transistor bank 306, a DC bias feed/input 308, an RF output port 310, a sub-circuit 312, a first harmonic trap 314, a second harmonic trap 316, a first ballast resistor $R_1$, a second ballast resistor $R_2$, a third ballast resistor $R_3$, a fourth ballast resistor $R_4$, a first capacitor $C_1$, a second capacitor $C_2$, a third capacitor $C_3$, and a fourth capacitor $C_4$.

As shown in FIG. 3, the RF input port 302 supplies an RF signal which is to be amplified and eventually transmitted by an RF output source (not shown), such as an antenna.

In the circuit shown in FIG. 3, the first RF transistor bank 304 and the second RF transistor bank 306 are connected in parallel and act together as one multiple bank RF power transistor to provide accumulated amplified output at the RF output port 310. In an embodiment, the first RF transistor bank 304 and the second RF transistor bank 306 include one or more RF transistors. In an embodiment, the first RF transistor bank 304 includes a first RF transistor 318 and a second RF transistor 320 connected together in parallel. The second RF transistor bank 306 includes a third RF transistor 322 and a fourth RF transistor 324 connected in parallel. In an embodiment, each of the RF transistors 318, 320, 322, and 324 include a multi-cell RF transistor having one or more RF transistor cells. In an embodiment, each of the RF transistors 318, 320, 322, and 324 include a multi-cell RF transistor having 12 transistor cells. In another embodiment, each of the RF transistors 318, 320, 322, and 324 includes a single cell transistor. In an embodiment, the first RF transistor bank 304 and the second RF transistor bank 306 can be combined to form a single RF transistor bank.

The function of the first RF transistor bank 304 and the second RF transistor bank 306 is apparent to a person of ordinary skill in the art and hence the same has not been described in detail for the sake of brevity. The function of the DC bias feed/input 308 is apparent to a person skilled in the art and hence the same has not been described in detail for the sake of brevity.

In an embodiment, the circuit shown in FIG. 3 can be implemented by using a common emitter configuration. In another embodiment, the circuit shown in FIG. 3 can be implemented by using a common base configuration.

The DC bias feed/input 308 provides bias to a base terminal of each of the first RF transistors 318 and the second RF transistor 320 of the first RF transistor bank 304. In an embodiment, the base terminal of the first RF transistor 318 is connected to a node $N_1$ through the first ballast resistor $R_1$ and the base terminal of the second RF transistor 320 is connected to the node $N_1$ through the second ballast resistor $R_2$. The node $N_1$ is connected to the DC bias feed/input 308. In another embodiment, the base terminal of the first RF transistor 318 is connected to the node $N_1$ and hence to the DC bias feed/input 308 without the first ballast resistor $R_1$ and the base terminal of the second RF transistor 320 is connected to the node $N_1$ and hence to the DC bias feed/input 308 without the second ballast resistor $R_2$. Further, in an embodiment, the base terminal of the first RF transistor 318 is connected to the RF input port 302 through the first capacitor $C_1$ and the base terminal of the second RF transistor 320 is connected to the RF input port 302 through the second capacitor $C_2$. Collector terminals of the first RF transistor 318 and the second RF transistor 320 are connected to the RF output port 310. In an embodiment, the collector terminals of the first RF transistor 318 and the second RF transistor 320 are connected to the RF output port 310, the first harmonic trap 314, and the second harmonic trap 316.

In an embodiment, emitter terminals of the first RF transistor 318 and the second RF transistor 320 are coupled together and connected to a ground through a substrate to ground connection 326. In another embodiment, the emitter terminals of the first RF transistor 318 and the second RF transistor 320 are coupled together and connected to the ground directly.

Similarly, the DC bias feed/input 308 provides bias to base terminals of the third RF transistor 322 and the fourth RF transistor 324 of the second RF transistor bank 306. In an embodiment, the base terminal of the third RF transistor 322 is connected to the node $N_1$ through the third ballast resistor $R_3$ and the base terminal of the fourth RF transistor 324 is connected to the node $N_1$ through the fourth ballast resistor $R_4$. The node $N_1$ is connected to the DC bias feed/input 308. In another embodiment, the base terminal of the third RF transistor 322 is connected to the node $N_1$ and hence to the DC bias feed/input 308 without the third ballast resistor $R_3$ and the base terminal of the fourth transistor 324 are connected to the node $N_1$ and hence to the DC bias feed/input 308 without the fourth ballast resistor $R_4$. Further, in an embodiment, the base terminal of the third RF transistor 322 is connected to the RF input port 302 through the third capacitor $C_3$ and the base terminal of the fourth RF transistor 324 is connected to the RF input port 302 through the fourth capacitor $C_4$. Collector terminals of the third RF transistor 322 and the fourth RF transistor 324 are connected to the RF output port 310. In an embodiment, the collector terminals of the RF transistor 322 and the fourth RF transistor 324 are connected to the RF output port 310, the first harmonic trap 314, and the second harmonic trap 316.

Although in FIG. 3, the first ballast resistor $R_1$, the second ballast resistor $R_2$, the third ballast resistor $R_3$, the fourth ballast resistor $R_4$, the first capacitor $C_1$, the second capacitor $C_2$, the third capacitor $C_3$, and the fourth capacitor $C_4$ are shown as single elements, a person skilled in the art will appreciate that the first ballast resistor $R_1$, the second ballast resistor $R_2$, the third ballast resistor $R_3$, the fourth ballast resistor $R_4$, the first capacitor $C_1$, the second capacitor $C_2$, the third capacitor $C_3$, and the fourth capacitor $C_4$ may include a combination of two or more elements. In an embodiment, each of the first ballast resistor $R_1$, the second ballast resistor $R_2$, the third ballast resistor $R_3$, the fourth ballast resistor $R_4$, the first capacitor $C_1$, the second capacitor $C_2$, the third capacitor $C_3$, and the fourth capacitor $C_4$ includes a combination of 12 elements.

In an embodiment, emitter terminals of the third RF transistor 322 and the fourth RF transistor 324 are coupled together and connected to the ground through a substrate to ground connection 328. In another embodiment, the emitter terminals of the third RF transistor 322 and the fourth RF transistor 324 are coupled together and connected to the ground directly.

A person of ordinary skill in art would appreciate that although FIG. 3 has been explained with reference to self ESD protected RF transistors, the present invention is not limited to only RF transistors. The present invention can also be implemented to provide self ESD protection for transistors used in other circuits such as a shunt regulator, TTL logic, and various bias networks. The present invention can also be implemented to provide self ESD protection for discrete transistors. When implemented to other circuits having a DC coupled input, the capacitor $C_1$, the capacitor $C_2$, the capacitor $C_3$, and the capacitor $C_4$ can be removed.

In an embodiment as shown in FIG. 3, a first terminal of the first harmonic trap 314 is connected to the collector terminals of the first RF transistor 318 and the second RF transistor 320 and a second terminal of the first harmonic trap 314 is connected to a first terminal of the second harmonic trap 316. A second terminal of the second harmonic trap 316 is connected to the RF output port 310.

In an embodiment, the first harmonic trap 314 includes a capacitor $C_5$, a capacitor $C_6$, a capacitor $C_7$, and an inductor $L_1$. First terminals of the capacitor $C_5$, the capacitor $C_6$, and the capacitor $C_7$ are coupled together and are connected to the first terminal of the first harmonic trap 314. Second terminals of the capacitor $C_5$, the capacitor $C_6$, and the capacitor $C_7$ are coupled together such that the capacitor $C_5$, the capacitor $C_6$, and the capacitor $C_7$ are connected in parallel to each other. The second terminals of the capacitor $C_5$, the capacitor $C_6$, and the capacitor $C_7$ are connected to a first terminal of the inductor $L_1$. In another embodiment, the capacitor $C_5$, the capacitor $C_6$, and the capacitor $C_7$ are replaced by a single capacitor whose first terminal is connected to the first terminal of the first harmonic trap 314 and second terminal is connected to a first terminal of the inductor $L_1$. A second terminal of the inductor $L_1$ is connected to the ground. In an embodiment, the second terminal of the inductor $L_1$ is connected to the ground through a substrate to ground connection 336. In another embodiment, the second terminal of the inductor $L_1$ is connected to the ground directly.

In an embodiment, the second harmonic trap 316 includes a capacitor $C_8$, a capacitor $C_9$, a capacitor $C_{10}$, and an inductor $L_2$. First terminals of the capacitor $C_8$, the capacitor $C_9$, and the capacitor $C_{10}$ are coupled together and are connected to the first terminal of the second harmonic trap 316. Second terminals of the capacitor $C_8$, the capacitor $C_9$, and the capacitor $C_{10}$ are coupled together such that the capacitor $C_8$, the capacitor $C_9$, and the capacitor $C_{10}$ are connected in parallel to each other. The second terminals of the capacitor $C_8$, the capacitor $C_9$, and the capacitor $C_{10}$ are connected to a first terminal of the inductor $L_2$. In another embodiment, the capacitor $C_8$, the capacitor $C_9$, and the capacitor $C_{10}$ are replaced by a single capacitor whose first terminal is connected to the first terminal of the second harmonic trap 316 and second terminal is connected to a first terminal of the inductor $L_2$. A second terminal of the inductor $L_2$ is connected to the ground. In an embodiment, the second terminal of the inductor $L_2$ is connected to the ground through a substrate to ground connection 338. In another embodiment, the second terminal of the inductor $L_2$ is connected to the ground directly.

Although FIG. 3 shows two harmonic traps, it may be appreciated that the disclosed embodiments can also be implemented with no harmonic trap, a single harmonic trap, and more than two harmonic traps. For example, when self protecting a transistor used in a DC bias network, no harmonic trap will be present.

In the circuit as shown in FIG. 3, the sub-circuit 312 includes a trigger circuit 330 and a leakage circuit 332. The sub-circuit 312 is connected to the RF output port 310. In an embodiment, one or more sub-circuits 312 are connected to each RF transistor cell of the multi-cell RF transistors of the first RF transistor bank 304 and the second RF transistor bank 306. In another embodiment, one or more sub-circuits 312 are connected to each of the multi-cell RF transistors of the first RF transistor bank 304 and the second RF transistor bank 306. In another embodiment, one or more sub-circuits 312 are connected to each of the first RF transistor bank 304 and the second RF transistor bank 306. In still another embodiment, one or more sub-circuits 312 are connected to a combination of the first RF transistor bank 304 and the second RF transistor bank 306. In still another embodiment, one or more sub-circuits 312 are connected to each of a single cell transistor.

In an embodiment, a first terminal of the trigger circuit 330 is connected to the RF output port 310. The collector terminal of each of the first RF transistor 318, the second RF transistor 320, the third RF transistor 322, and the fourth RF transistor 324 are connected to the RF output port 310. A second terminal of the trigger circuit 330 is connected to the node $N_1$. The node $N_1$ is connected to the base terminal of each of the first RF transistor 318, the second RF transistor 320, the third RF transistor 322, and the fourth RF transistor 324. Thus, the trigger circuit 330 is connected between the collector terminal and the base terminal of each of the first RF transistor 318, the second RF transistor 320, the third RF transistor 322, and the fourth RF transistor 324. The trigger circuit 330 includes one or more trigger diodes. In an embodiment, the trigger circuit 330 includes N number of trigger diodes. In an embodiment, the trigger diodes are Base-Emitter diodes. A person skilled in the art will appreciate that any other diode can also be used without deviating from the scope of the present invention.

On a positive polarity ESD pulse, the trigger diodes are arranged to breakdown and trigger an RF transistor to a pre-defined state. In an embodiment, on the positive polarity ESD pulse, when a voltage at the collector terminal of the RF transistor (such as the first RF transistor 318, the second RF transistor 320, the third RF transistor 322, and the fourth RF transistor 324) exceeds a sum of magnitude of forward base-emitter turn-on voltage ($V_{be}$) of the RF transistor and the N times base-emitter junction breakdown voltage of a Base-Emitter trigger diode, the trigger diodes conduct into the base-emitter bias feed path (base junction) of the RF transistor which is triggered to the pre-defined state. The RF transistor when operating in the pre-defined state, clamps the positive polarity ESD pulse. In an embodiment, the RF transistor turns on and clamps the positive ESD pulse from the collector terminal to the emitter terminal. In another embodiment, the RF transistor turns on and clamps the positive ESD pulse from the collector terminal to the ground. In an embodiment, the first RF transistor 318, the second RF transistor 320, the third RF transistor 322, and the fourth RF transistor 324 turns on simultaneously. In another embodiment, the first RF transistor 318, the second RF transistor 320, the third RF transistor 322, and the fourth RF transistor 324 turns on one after the other such that the trigger network with the lowest breakdown voltage turns on first.

A first terminal of the leakage circuit 332 is connected to the second terminal of the trigger circuit 330 and the node $N_1$. The node $N_1$ is connected to the base terminal of each of the first RF transistor 318, the second RF transistor 320, the third RF transistor 322, and the fourth RF transistor 324. In an embodiment, a second terminal of the leakage circuit 332 is connected to the emitter terminal of each of the first RF transistor 318, the second RF transistor 320, the third RF transistor 322, and the fourth RF transistor 324. Thus, the leakage circuit 332 is connected between the base terminal and the emitter terminal of each of the first RF transistor 318, the second RF transistor 320, the third RF transistor 322, and the fourth RF transistor 324. In another embodiment, the second terminal of the leakage circuit 332 is connected to the ground. In an embodiment, the second terminal of the leakage circuit 332 is connected to the ground through a substrate to ground connection 334. In another embodiment, the second terminal of the leakage circuit 332 is connected to the ground directly.

In an embodiment, the leakage circuit 332 includes a single leakage cancellation/shunt path diode. In another embodiment, the leakage circuit 332 includes two or more parallel connected leakage cancellation/shunt path diodes. In yet another embodiment, the leakage circuit 332 includes two or more series connected leakage cancellation/shunt path diodes. In an embodiment, the leakage cancellation/shunt path diode is a Base-Emitter diode. A person skilled in the art will appreciate that any other diode can also be used without deviating from the scope of the present invention.

In an embodiment, the trigger circuit 330 along with the leakage circuit 332 forms a shunt path to ground for negative polarity ESD pulses. The shunt path turns on at (N+1) times forward turn-on voltage of the base-emitter diodes of the trigger circuit 330 and the leakage circuit 332.

In an embodiment, the leakage circuit 332, besides forming the shunt path, also provides a leakage path in order to prevent each of the first RF transistor 318, the second RF transistor 320, the third RF transistor 322, and the fourth RF transistor 324 from turning on from the leakage current from base-emitter junction of the trigger diodes. The leakage circuit 332 shunts the leakage current of the trigger circuit 330 to the ground. In an embodiment, the leakage circuit 332 shunts the leakage current of the trigger circuit 330 to the ground through the substrate to ground connection 334. In another embodiment, the leakage circuit 332 shunts the leakage current of the trigger circuit 330 to the ground directly. In still another embodiment, the leakage circuit 332 shunts the leakage current of the trigger circuit 330 to a terminal other than ground, such as a battery terminal. If a leakage current from the trigger diode network flows into the base terminal of either of the first RF transistor 318, the second RF transistor 320, the third RF transistor 322, and the fourth RF transistor 324, the respective transistor may start to turn-on before the desired turn-on or protection threshold in the forward biased direction. When the transistor begins to turn on, the protection circuit leaks current in the forward biased direction. Such an undesired leakage could, for example, slowly drain a battery in a portable device.

In an embodiment, the Base-Emitter trigger diodes and the leakage diodes are designed to be able to withstand the negative polarity ESD pulse to ground.

In an embodiment, the value of N is determined such that the turn-on trigger voltage is higher than the normal peaks of the signal and/or below the breakdown voltage of the transistor (given the process technology, transistor area, etc.)

In an embodiment, the single Base-Emitter leakage cancellation/shunt path diode of the leakage circuit 332 is matched to the trigger diodes of the trigger circuit 330 to shunt any leakage current from the trigger diode (stack) to the ground. Such matching is supported by monolithic construction of the circuit and by arranging the diodes in close proximity.

In another embodiment, the single Base-Emitter leakage cancellation/shunt path diode of the leakage circuit 332 is matched to the trigger diodes of the trigger circuit 330 to shunt any leakage current from the trigger diode (stack) to the ground. Such matching is achieved by constructing the single Base-Emitter leakage cancellation/shunt path diode out of two parallel copies of the trigger diode cell or by scaling the size of the single Base-Emitter leakage cancellation/shunt path diode to guarantee that the single Base-Emitter leakage cancellation/shunt path diode has higher leakage than the trigger diodes.

In an embodiment, the base-emitter junction breakdown voltage of the N+1 triggering diodes is 7-8 volts for N=1 and 14-16 volts for N=2 for certain common commercial HBT transistor processes.

In an embodiment, the leakage cancellation/shunt path diode and the trigger diode are matched in design, layout and device characteristics.

In an embodiment, the present invention is advantageous for RF output transistors. The RF output transistor has a high current and safe-operating area. Therefore, it is inherently a large transistor with a much stronger clamping capability than the independent use of conventionally used ESD clamp transistors or ESD diodes, because a stand-alone protection circuit must be very small to ensure a practical die area and low costs, as well as for acceptable capacitance and RF performance.

In known art, the RF output transistor of an RF power amplifier is an external port on the amplifier with particularly ESD critical connections (battery, antenna). Therefore, an efficient and high capability ESD protection circuit is required without sacrificing a significant amount of die area and compromising on the performance of the RF amplifier.

The circuit disclosed in FIG. 3 provides such an ESD protection circuit, which re-uses the RF output transistor as a clamp transistor, enabling the RF transistor to self protect from ESD damage with minimal die area consumption.

In an embodiment, the sub-circuit 312 disclosed in FIG. 3 has a very small value of capacitance and does not significantly reduce the (critical) RF gain and PAE (power added efficiency) of the RF power amplifier. Therefore, the sub-circuit 312 provides efficient ESD protection without affecting the working characteristics of the RF amplifier.

In an embodiment, the sub-circuit 312 may be buried under air-bridge metal or Interlayer Dielectric (ILD) metal in an existing transistor layout without using additional area. Therefore, the setup requires nearly zero additional area as well as cost for adding the sub-circuit 312 to the existing transistor.

Various embodiments of the present invention provide several advantages. The additional cost and area for implementing a sub-circuit in the existing RF transistor is reduced.

Returned Material Authorization (RMA) analysis of RF transistors and/or products containing RF transistors reveals that one cell can fail before another cell in the circuit in an ESD event, i.e. one cell of a multi-cell transistor can fail first. Potentially one cell can be weaker than another cell due to a variety of issues including layout asymmetries and process variation.

Another advantage of the present invention is that the above-mentioned problem may be resolved by connecting each cell of a multi-cell transistor with a sub-circuit, which enables superior protection of the bank that is either weakest, or subject to failure first in the ESD event.

Another advantage of the present invention is that the sub-circuit may be embedded into the RF transistor with zero or nearly zero additional area and cost by reusing the protected RF transistor as the clamping transistor for the positive/forward path as opposed to adding an addition area (hence cost) consuming clamping device, and using layout techniques where the trigger sub-circuits are placed under metallization such as air-bridge metallization, ILD metallization, etc.

Another advantage of the present invention is that the use of the Base-Emitter junction as a trigger, results in a repeatable trigger voltage suitably matched to the breakdown voltage of many commercial HBT processes.

Still another advantage of the present invention is that once the sub-circuit has been suitably designed, embedded, and tested for a given transistor process and geometry/application, the need for additional ESD protection sub-circuits, device/chip area, product cost, and engineering cost is eliminated or greatly reduced.

Still another advantage of the present invention is that no additional process steps or devices are required. The sub-circuit is fabricated out of the same layers used to fabricate the transistor (base-emitter junction, interconnect).

Another advantage of the present invention is that the present invention is suitable for an RF transistor due to the low impact on RF performance; as well as for non-RF applications.

While various embodiments of the present invention have been illustrated and described, it will be clear that the present invention is not limited to these embodiments only. Numerous modifications, changes, variations, substitutions and equivalents will be apparent to those skilled in the art without departing from the spirit and scope of the invention, as described in the claims that follow.

What is claimed is:

1. A sub-circuit for protecting an electronic circuit from an Electro-Static Discharge (ESD), the electronic circuit comprising one or more transistors, the sub-circuit comprising:
a trigger circuit connected between a collector terminal and a base terminal of each of the one or more transistors, the trigger circuit configured to trigger the one or more transistors to a pre-defined state on a positive polarity ESD pulse, the one or more transistors operating in the pre-defined state clamping the positive polarity ESD pulse; and
a leakage circuit connected between the base terminal and an emitter terminal of the each of the one or more transistors, wherein the leakage circuit and the trigger circuit shunt a negative polarity ESD pulse to ground.

2. The sub-circuit of claim 1, wherein the trigger circuit comprises one or more base-emitter diodes.

3. The sub-circuit of claim 1, wherein the trigger circuit is connected to the base terminal of each of the one or more transistors through a resistor.

4. The sub-circuit of claim 2, wherein the trigger circuit triggers the one or more transistors to the pre-defined state based on a sum of magnitude of forward base-emitter turn-on voltage of the one or more RF transistors, and a base-emitter junction breakdown voltage associated with each of the one or more base-emitter diodes.

5. The sub-circuit of claim 1, wherein the leakage circuit shunts a leakage current of the trigger circuit to the ground.

6. The sub-circuit of claim 1, wherein the leakage circuit comprises a base emitter diode.

7. The sub-circuit of claim 1, wherein the one or more transistors turn on when triggered to the pre-defined state.

8. The sub-circuit of claim 1, wherein the electronic circuit is a radio-frequency (RF) amplifier circuit.

9. An Electro-Static Discharge (ESD) protected RF amplifier circuit, the RF amplifier circuit comprising:
one or more RF transistors configured to amplify an RF signal; and
a sub-circuit for protecting the one or more RF transistors from the ESD, wherein the sub-circuit comprises:
a trigger circuit connected between a collector terminal and a base terminal of each of the one or more transistors, the trigger circuit configured to trigger the one or more transistors to a pre-defined state on a positive polarity ESD pulse, the one or more RF transistors operating in the pre-defined state clamping the positive polarity ESD pulse, and
a leakage circuit connected between the base terminal and an emitter terminal of the each of the one or more RF transistors, wherein the leakage circuit and the trigger circuit shunt a negative polarity ESD pulse to ground.

10. The RF amplifier circuit of claim 9, wherein the one or more RF transistors operating in the pre-defined state clamp the positive polarity ESD pulse to the ground.

11. The RF amplifier circuit of claim 9, wherein the one or more RF transistors operating in the pre-defined state clamp the positive polarity ESD pulse to the emitter terminal.

12. The RF amplifier circuit of claim 9, wherein the trigger circuit comprises one or more base-emitter diodes.

13. The RF amplifier circuit of claim 9, wherein the trigger circuit triggers the one or more RF transistors to the pre-defined state based on a sum of magnitude of forward base-emitter turn-on voltage of the one or more RF transistors, and a base-emitter junction breakdown voltage associated with each of the one or more base-emitter diodes.

14. The RF amplifier circuit of claim 9, wherein the leakage circuit shunts a leakage current of the trigger circuit to the ground.

15. The RF amplifier circuit of claim 9, wherein the trigger circuit is connected to the base terminal of each of the one or more RF transistors through a resistor.

16. The RF amplifier circuit of claim 9, wherein the leakage circuit comprises a base-emitter diode.

17. The RF amplifier circuit of claim 9, wherein the one or more transistors turn on when triggered to the pre-defined state.

18. An Electro-Static Discharge (ESD) protected RF amplifier circuit, the RF amplifier circuit comprising:
   one or more RF transistors configured to amplify a RF signal; and
   a sub-circuit for protecting the one or more RF transistors from the ESD, wherein the sub-circuit comprises:
      a trigger circuit connected to a collector terminal of each of the one or more RF transistors and a base terminal of each of the one or more RF transistors through a resistor, the trigger circuit configured to trigger the one or more RF transistors to a pre-defined state on a positive polarity ESD pulse, the one or more RF transistors operating in the pre-defined state clamping the positive polarity ESD pulse, and
      a leakage circuit connected between the base terminal and an emitter terminal of the each of the one or more RF transistors, wherein the leakage circuit and the trigger circuit shunt a negative polarity ESD pulse to ground.

19. The RF amplifier circuit of claim 18, wherein the trigger circuit triggers the one or more RF transistors to the pre-defined state based on a sum of magnitude of forward base-emitter turn-on voltage of the one or more RF transistors, and a base-emitter junction breakdown voltage associated with each of one or more base-emitter diodes of the trigger circuit.

20. The RF amplifier circuit of claim 9, wherein the RF amplifier circuit enables the one or more RF transistors to self-protect from the ESD damages with minimal die area consumption.

* * * * *